Dec. 13, 1949 W. E. ENNS 2,491,095
NETWORK ANALYZER
Filed Nov. 20, 1944 6 Sheets-Sheet 1

WALDO E. ENNS
INVENTOR.
BY *E. A. Buchan*
ATTORNEY.

Fig. 3.

Dec. 13, 1949 W. E. ENNS 2,491,095
NETWORK ANALYZER
Filed Nov. 20, 1944 6 Sheets-Sheet 3

Fig. 4.

WALDO E. ENNS
INVENTOR.
BY *E. A. Buckham*
ATTORNEY.

Dec. 13, 1949  W. E. ENNS  2,491,095
NETWORK ANALYZER
Filed Nov. 20, 1944  6 Sheets-Sheet 4

Fig. 5.

Wattmeter reading – $P =$ $$(E_p)_a \left[ \frac{(V_p)_{ab}}{M_{ab}} + \frac{(V_p)_{ac}}{M_{ac}} + \frac{(V_q)_{ab}}{N_{ab}} + \frac{(V_q)_{ac}}{N_{ac}} \right] + (E_q)_a \left[ \frac{(V_q)_{ab}}{M_{ab}} + \frac{(V_q)_{ac}}{M_{ac}} - \frac{(V_p)_{ab}}{N_{ab}} - \frac{(V_p)_{ac}}{N_{ac}} \right]$$

WALDO E. ENNS
INVENTOR.

BY  E. G. Buckham
ATTORNEY.

Dec. 13, 1949 W. E. ENNS 2,491,095
NETWORK ANALYZER
Filed Nov. 20, 1944 6 Sheets-Sheet 5

WALDO E. ENNS
INVENTOR.

BY *E. A. Buckhorn*
ATTORNEY.

Dec. 13, 1949 W. E. ENNS 2,491,095
NETWORK ANALYZER
Filed Nov. 20, 1944 6 Sheets-Sheet 6

Fig. 8.

WALDO E. ENNS
INVENTOR.
BY
ATTORNEY.

Patented Dec. 13, 1949

2,491,095

UNITED STATES PATENT OFFICE 2,491,095

NETWORK ANALYZER

Waldo E. Enns, Portland, Oreg.

Application November 20, 1944, Serial No. 564,365

9 Claims. (Cl. 235—61)

This invention relates to apparatus for analyzing circuit characteristics of alternating current networks and, more particularly, for making determinations of both real and reactive power flow as well as of voltage and current conditions.

The determination of load flow, voltage and current characteristics of even relatively simple alternating current networks involves computations of such complex nature as to render accurate solution extremely difficult, if not practically impossible. Ordinarily in the design of distribution networks, modifications thereof, or extensions thereto, only rough calculations are made, which are then checked against past experiences for the detection of obvious error. The results derived by such methods generally prove quite satisfactory, though in most instances considerable improvement in network performance could be accomplished if more accurate determinations were available.

Computing boards have been designed for making determinations of network characteristics, but these boards are themselves generally very complicated, and extremely expensive, so that it is not practical for the average power distributor to install one, not only because of the high cost but also because of the lack of the highly trained personnel required for its operation. Accordingly, there is a definite need for a relatively simple network analyzer which can be provided at relatively low cost and which is capable of making reasonably accurate determinations of network circuit characteristics.

In my prior Patent No. 2,323,588, dated July 6, 1943, and entitled Apparatus for A. C. network analysis, is described an apparatus and method for obtaining power, voltage and current determinations wherein the resistance and reactive components of a network are set up in two independent simulated networks, each of which is made up of a plurality of resistors. The values of the resistors of the first network are proportional to the ohmic values of the resistance of the corresponding links of the actual network to be analyzed, while the resistors of the second network are adjusted to correspond to the ohmic impedance of the reactance of the actual network links.

In the operation of the network analyzer described in that patent, current conditions are set up in the two networks proportional in the first network to the actual in-phase components, and in the second to the actual quadrature-phase components. Under these circumstances the resultant currents flowing in each link of each of the two networks produce voltage drops and the sum of which in the two links corresponding to any one link of the actual network will be substantially equal to one component of the voltage drop in the actual network. A similar procedure is then carried out with the power and reactive components of current interchanged as between the two simulated networks to obtain the other quadrature voltage drop components, which are applied to the known or assumed potential components at the point chosen as the reference for the system, and the two components thus obtained are added vectorially to obtain total voltages throughout the system, and from this network, losses, reactive kva, and phase angles throughout the network may be obtained.

While the accuracy and dependability of the apparatus and method disclosed in that patent are good, considerable is left to be desired in the way of simplicity, for direct readings are not given of the desired ultimate values. Obviously a network analyzer is preferred which, when once set up, will provide direct readings of current, voltage and real and reactive power. As distinguished from the method and apparatus of my prior patent, according to the present invention a pair of simulated networks are set up with a plurality of resistance units across which potentials are impressed proportional to in-phase and quadrature components occurring across corresponding portions of the actual network. Resultant current values are created which are grouped and combined algebraically in suitable measuring instruments according to equations herein developed for providing direct indications of both real and reactive power flow. The system of my prior patent is also of a constant current type, whereas the present system is of a constant potential type which is definitely an important advantage because of the fact that much less equipment is required.

It is a primary object of the present invention to provide a relatively simple and inexpensive network analyzer and which will provide direct readings of the ultimate desired values of circuit characteristics.

A further object of the present invention is to provide a network analyzer in which each link of an alternating current network is represented by a plurality of resistors and to the terminals of which voltage components are impressed proportional to voltage components of the actual network, while the resultant currents flowing simultaneously through a measuring instrument provide indications of the actual circuit characteristics.

More specifically it is an object of the present invention to provide a network analyzer in which each circuit link connected to a bus is represented by two pairs of resistors arranged in two simulated networks across which are impressed potentials proportional respectively to the in-phase and quadrature components of the voltages assumed to occur across corresponding portions of the given network and whereby resultant currents are created which may be passed through suitable meters to provide indications corresponding to the desired network characteristics.

In accordance with an illustrated embodiment, the analyzer of the present invention is comprised essentially of a plurality of pairs of resistance elements, two pairs of such elements representing each of the circuit links connected to a common bus, one element of each of the two pairs having a resistance proportional to the reciprocal of the conductance of the corresponding circuit link, the other of each of the two pairs having a resistance proportional to the reciprocal of the susceptance of the corresponding circuit link. The resistance elements of the various pairs are divided into two networks of similar configuration and potentials are impressed across the corresponding elements in the two networks proportional respectively to the in-phase and quadrature components of the voltage drop occurring across the corresponding actual network links. The resultant current values thus created are passed through the coils of a wattmeter type measuring instrument providing readings, which according to equations herein developed, are proportional to either the real or reactive power flow.

For a consideration of what is believed novel and inventive attention is directed to the following detailed description together with the accompanying drawings while the features of novelty will be pointed out with greater particularity in the appended claims.

In order that the present invention may be more readily understood it is desirable first to review certain well known fundamental equations relating to current, voltage and power characteristics of alternating current circuits.

If a vector voltage drop $V = V_p + jV_q$ occurs in a 3-phase circuit of impedance $Z = R + jX$ ohms to neutral the voltage drop to neutral is $$V = V_p + jV_q = (I_p R - I_q X) + j(I_q R + I_p X)$$

where vector V refers to the same reference axis as vector I.

If a vector voltage drop $V = V_p + jV_q$ occurs in a circuit with impedance $Z = R + jX$ then the vector current flowing will be $$I = I_p + jI_q = V/Z = (V_p + jV_q)/(R + jX) =$$
$$(GV_p + BV_q) + j(GV_q - BV_p)$$

where conductance $G = R/Z^2$ and susceptance $B = X/Z^2$.

If the voltage to neutral at one end of the circuit is $E = E_p + jE_q$ volts then, with balanced loading on the three phases at this end, the real power is $P = 3(E_p I_p + E_q I_q)$, and the reactive power is $Q = 3(E_p I_q - E_q I_p)$. By substituting for $I_p$ and $I_q$ in these equations $(GV_p + BV_q)$ and $(GV_q - BV_p)$, respectively, these equations for P and Q may be rewritten as follows:

$$P = 3E_p(GV_p + BV_q) + 3E_q(GV_q - BV_p) \quad (1)$$
$$Q = 3E_p(GV_q - BV_p) - 3E_q(GV_p + BV_q) \quad (2)$$

From these last two equations it will be noted that both real and reactive power may be expressed solely in terms of circuit constants and the in-phase and quadrature components of impressed potential and of the voltage drops occurring across them. It will be obvious that the expressions $GV_p$, $GV_q$, $BV_p$, $BV_q$ cannot be reproduced in electrical units and hence Equations 1 and 2 are incapable of solution in an analyzer in that form. However, if the terms G and B in the Equations 1 and 2 are replaced by their reciprocals the new equations are capable of being set up on an analyzer, as will be described, and solved electrically. For convenience, these reciprocals may be designated as M and N, respectively thus:

$$M = 1/G \quad (3)$$
$$N = 1/B \quad (4)$$

By substituting M and N for the values G and B, respectively, the above Equations 1 and 2 for P and Q may be written thus:

$$P = 3E_p(V_p/M + V_q/N) + 3E_q(V_q/M - V_p/N) \quad (5)$$
$$Q = 3E_p(V_q/M - V_p/N) - 3E_q(V_p/M + V_q/N) \quad (6)$$

It will be recognized that the constants M and N in the above Equations 5 and 6 may be represented by ohmic quantities in which case the quotient of the various fractional expressions may be determined electrically as a current value by impressing a voltage component proportional to the numerator across a resistor proportional to the denominator.

The various current values may readily be added algebraically and the sum effectively multiplied by the voltage values $E_p$ and $E_q$ in a wattmeter type of measuring instrument. Each of the four quantities, $$\frac{V_p}{M}, \frac{V_q}{N}, \frac{V_q}{M}, \frac{V_p}{N}$$

is dimensionally the same and the quotient of each is a current which is numerically the same whether the voltages $V_p$ and $V_q$ are alternating or direct current.

From the above Equations 5 and 6 the total net real and reactive power flow in a group of circuits connected to a common bus may be expressed as follows:

$$P = 3E_p[\Sigma(V_p/M) + \Sigma(V_q/N)] + \\ 3E_q[\Sigma(V_q/M) - \Sigma(V_p/N)] \quad (7)$$

$$Q = 3E_p[\Sigma(V_q/M) - \Sigma(V_p/N)] - \\ 3E_q[\Sigma(V_p/M) + \Sigma(V_q/N)] \quad (8)$$

In these Equations 5 to 8, inclusive, $E_p$ = the in-phase component of impressed voltage
$E_q$ = the quadrature-phase component of impressed voltage
$V_p$ = the in-phase component of voltage drop occurring across a circuit
$V_q$ = the quadrature-phase component of voltage drop occurring across a circuit
$M$ = the reciprocal of the conductance of a circuit
$N$ = the reciprocal of the susceptance of a circuit It follows from the above that if a generator supplies a group of circuits from a bus the algebraic sum of the real power flowing in the circuits is a measure of the real power supplied from the generator. Similarly, the algebraic sum of the reactive power flowing in the circuits is a measure of the reactive power supplied from the generator. It is also clear that if a load is supplied from a bus which is in turn supplied from a group of circuits then the algebraic sum of the real power flowing in the circuits is a measure of the real power supplied to the load. Likewise the algebraic sum of the reactive power in the circuits is a measure of the reactive power supplied to the load, or in case the load has a leading power factor, it will be a measure of the reactive power supplied from the load.

Figure 1:
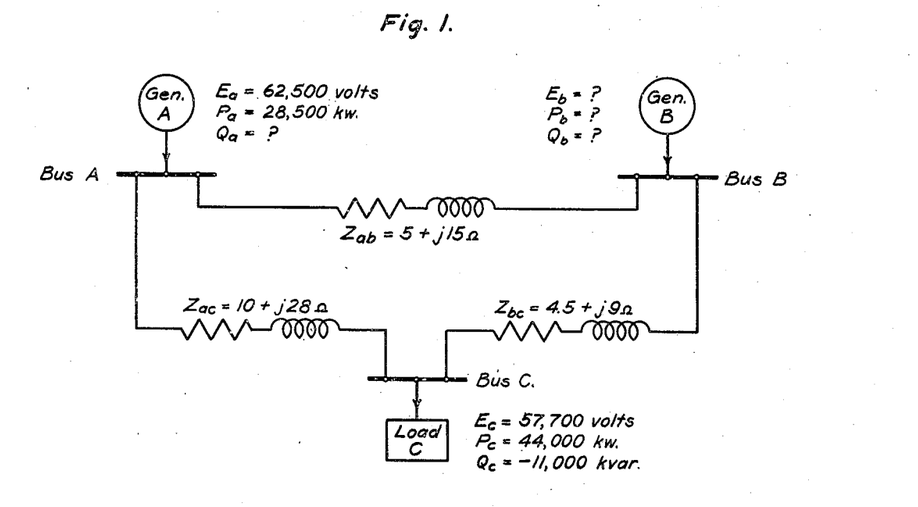
Fig. 1 is a schematic impedance diagram of one phase of an actual balanced three-phase network.

The invention will now be described with reference to an actual problem, and while the description given will represent the analyzer in perhaps its simplest form, the principle of the present invention is adequately illustrated thereby so that its applicability to the more complicated problems met in actual practice will be readily apparent to one skilled in the art. Accordingly, the problem in this case will consist of the determination of the circuit characteristics of a relatively simple network including two power generation stations and a load connected in a closed loop circuit. Referring to Fig. 1, the network is shown as comprising generators A and B connected for supplying power to corresponding busses designated bus A and bus B, respectively, while a load C is shown connected to bus C. The busses A and B are connected together by a circuit link having a certain known impedance which is assumed to be $Z_{ab} = 5 + j15$ ohms, the busses A and C by a circuit link having an impedance assumed as $Z_{ac} = 10 + j28$ ohms and busses B and C by a circuit having an impedance assumed to be $Z_{bc} = 4.5 + j9$ ohms. It is furthermore assumed that the real power output $P_a$ of generator A is 28,500 kw., while the voltage $E_a$ at bus A is assumed at 62,500 volts. The voltage $E_c$ at bus C is assumed at 57,700 volts with real power $P_c$ delivered to load C amounting to 44,000 kw. and reactive power $Q_c$ of 11,000 kvar. For convenience, the above assumed or known values, as well as the unknown values, are indicated on Fig. 1. The problem consists of determining the flow of real and reactive power at each terminal of each of the three circuits AB, BC, AC, respectively; the reactive output of generator A, the real and reactive output of generator B and the voltage at bus B.

Figure 2:
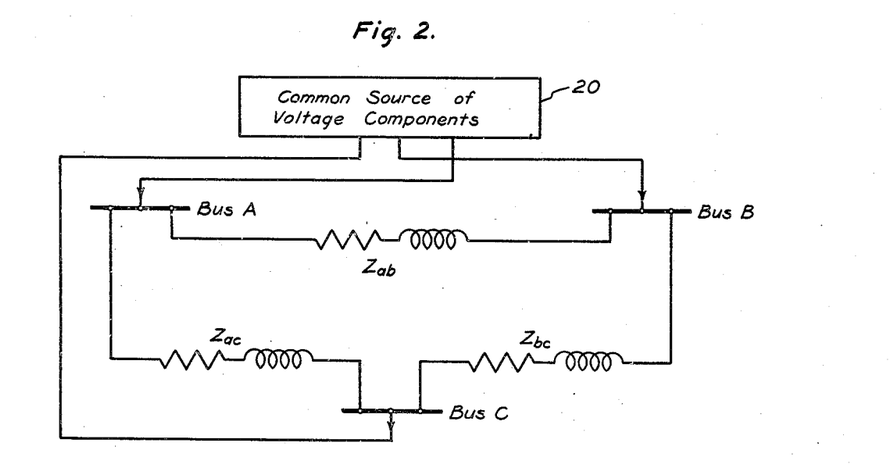
Fig. 2 is a schematic impedance diagram of the same network with a common source of voltage components substituted for the generators and load.

In setting up the simulated network according to the present invention, the equivalent bus voltages, or voltage components, are preferably provided by a common voltage source. This is primarily a matter of convenience and economy rather than of necessity for, as it will subsequently appear, the voltage components may equally well be supplied by independent sources. In Fig. 2 is shown a schematic diagram of the network given in Fig. 1, but in this case the generators A and B and the load C are replaced by a common source of voltage components which is indicated by the rectangle 20. The load bus C is connected to a low voltage point of the source 20, bus A to a high voltage point and bus B to an intermediate voltage point of the source 20. By suitable adjustment of connections to the source 20 the relative potentials at the different busses can be made to correspond accurately with the potentials maintained by the generators and load connected to the actual system. It will be apparent to those skilled in the art that if due regard is given to the quadrature components of the potential connected to each bus and to the phase angles between the different bus voltages then terminals representing the different busses may be connected to different taps of a common voltage source and the current and voltage conditions of the actual network accurately simulated.

Figure 3:
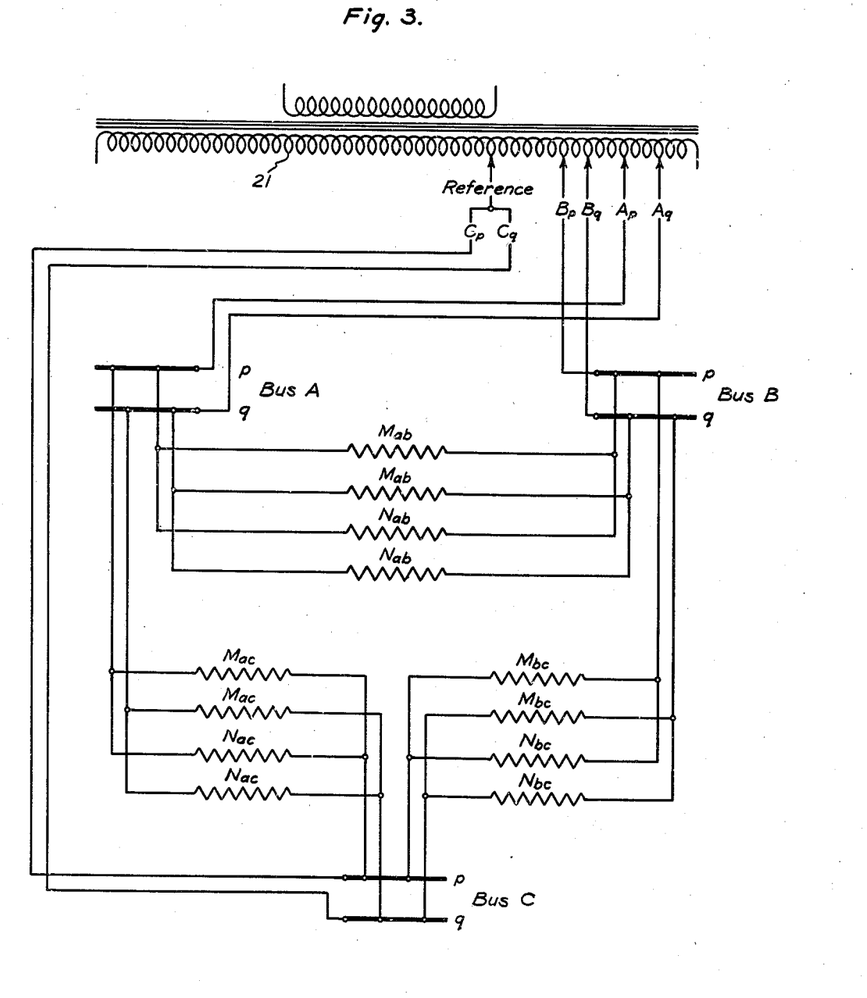
Fig. 3 is a schematic diagram of a pair of simulated resistance networks representing the network of Fig. 1 in accordance with the present invention.

The diagram of Fig. 3 illustrates the basic equivalent circuit arrangement according to the present invention and represents the circuit of Fig. 1 as it may be broken down for analyzing the characteristics of the actual network. The network is divided into two identical sections, each of which, it will be noted, bears a resemblance to the schematic diagram of Fig. 2. For convenience of illustration, the two sections are superimposed upon each other in Fig. 3 and are identified by the reference characters $p$ and $q$ which are applied to the terminals of each pair representing the busses A, B and C. The bus terminals designated P are connected to suitable taps of the common voltage source, so that potentials are applied thereto corresponding to the in-phase voltage components of the actual network. This network section will be referred to hereinafter simply as the "phase" section. The bus terminals designated $q$ and identifying the second network section are connected to suitable taps of the voltage source so that voltages are impressed corresponding to the quadrature voltage components of the actual network. This network section will be referred to hereinafter as the "quadrature" section. It will furthermore be observed that each link of the network of Fig. 1 is replaced by two pairs of resistance units, the two pairs being designated M and N respectively. The M resistance units are adjusted so that their ohmic value corresponds to the reciprocal of the conductance of that particular circuit link, while the N resistance units are adjusted so that their ohmic values correspond to the reciprocal of the susceptance of the corresponding circuit link. One of each of these pairs of resistance units are connected in parallel between each of the $p$ and $q$ bus terminals, forming the two identical phase and quadrature network sections as previously referred to. As will be explained more fully hereinafter both the $p$ and $q$ terminals of the bus C are shown connected to a common point on the voltage source represented by the transformer 21, which point is used as a basis for reference. The tap connections for the remaining bus terminals to the transformer 21 are so adjusted that the voltages applied thereto correspond with the in-phase and quadrature components of the actual voltage conditions.

It has been found convenient in common engineering practice to set up and solve network problems on a percentage basis rather than deal with the actual figures and accordingly the present problem will also be solved on a percentage basis and on a 20,000 kva. base.

The voltage of bus C will be selected as the reference voltage for purposes of this problem, so that $$E_c = (E_p)_c + j(E_q)_c = 57{,}700 + 0$$

or, expressed in percent, $$(E_p)_c = 100\%$$

and $$(E_q)_c = 0\%$$

The circuit constants of resistance and reactance may also be converted to the 20,000 kva. base as follows:

*Tabulation 1*

$$R\% = \frac{R \times \text{kva. Base}}{(KV)^2 \times 10} = \frac{20{,}000}{(57.7)^2 \times 10} R = 0.6R \text{ ohms}$$

$$X\% = \frac{X \times \text{kva. Base}}{(KV)^2 \times 10} = \frac{20{,}000}{(57.7)^2 \times 10} X = 0.6X \text{ ohms}$$

$$Z_{ab} = (5+j15) = 0.6(5+j15)\% = (3+j9)\%$$
$$Z_{ac} = (10+j28) = 0.6(10+j28)\% = (6+j16.8)\%$$
$$Z_{bc} = (4.5+j9) = 0.6(4.5+j9)\% = (2.7+j5.4)\%$$

From the above, the values for M and N may be readily derived in a percentage form, as follows:

*Tabulation 2*

$$M_{ab} = \frac{Z_{ab}^2}{R_{ab}} = \frac{9+81}{3} = 30\%$$

$$M_{ab} = \frac{Z_{ab}^2}{X_{ab}} = \frac{9+81}{9} = 10\%$$

$$M_{ac} = \frac{Z_{ac}^2}{R_{ac}} = \frac{36+282}{6} = 53\%$$

$$N_{ac} = \frac{Z_{ac}^2}{X_{ac}} = \frac{36+282}{16.8} = 18.9\% \text{ (use } 19\%\text{)}$$

$$M_{bc} = \frac{Z_{bc}^2}{R_{bc}} = \frac{7.3+29.2}{2.7} = 13.5+\% \text{ (use } 14\%\text{)}$$

$$N_{bc} = \frac{Z_{bc}^2}{X_{bc}} = \frac{7.3+29.2}{5.4} = 6.7+\% \text{ (use } 7\%\text{)}$$

Figure 4:
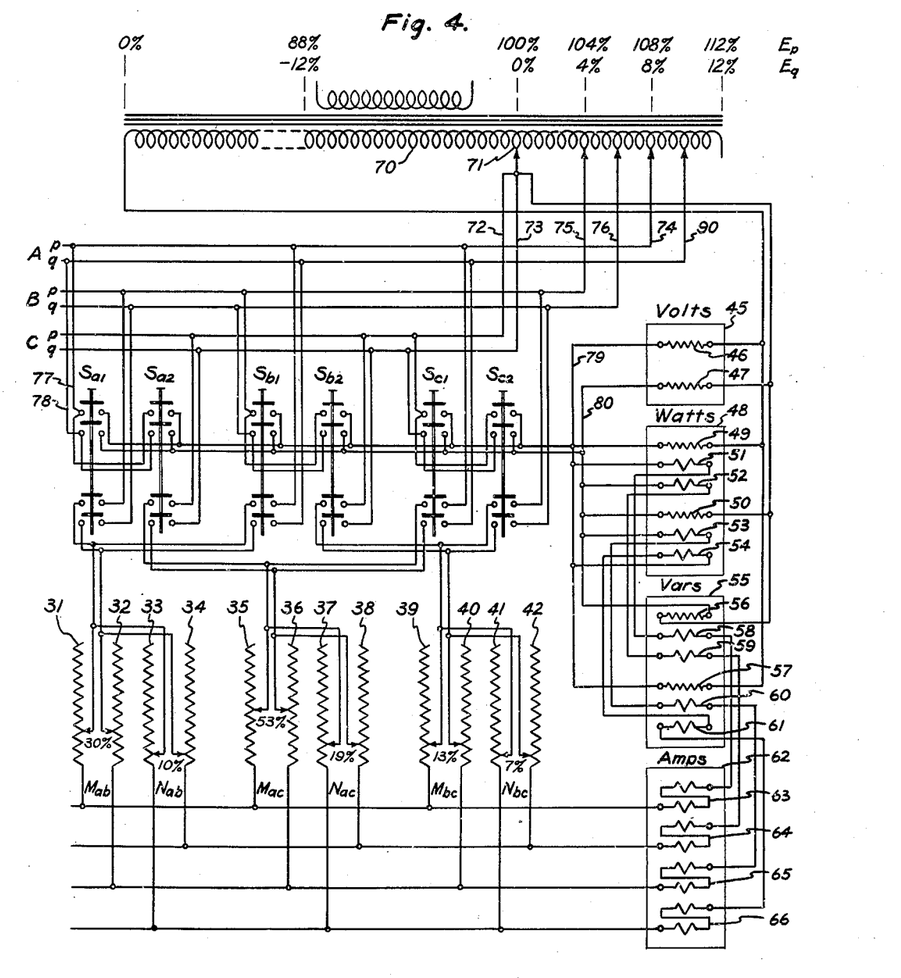
Fig. 4 is a wiring diagram for the simulated networks of Fig. 3 as they may be set up for analysis.

These percentage values may then be used in setting up the calculator. In Fig. 4 is shown the calculator as it may be set up for the present case, the circuit being substantially similar to that of Fig. 3 except that a plurality of measuring instruments are included, along with a number of selector switches. A plurality of pairs of M and N resistors are shown and separately identified by the reference characters 31 to 42 inclusive. The various pairs of resistors M and N, respectively, are similarly adjusted to correspond with the various values as computed above for $M_{ab}$, $N_{ab}$, etc. As mentioned in connection with Fig. 3, the resistors of the M and N pairs are divided into two identical network sections between the $p$ and $q$ terminals of the respective busses A, B and C. The circuits between the various busses may be controlled by a plurality of suitable selector switches identified by the reference characters $S_{a1}$, $S_{a2}$, $S_{b1}$, $S_{b2}$, $S_{c1}$, $S_{c2}$. Each of the selector switches are provided with a plurality of sets of contactors, an upper set for controlling the connections to the measuring instruments and a lower set for controlling the connections of the resistors to the bus terminals.

The measuring instruments as shown in Fig. 4 comprise a voltmeter 45, including coils 46 and 47, a wattmeter 48 having voltage coils 49 and 50 and current coils 51—54, a varmeter 55 having voltage coils 56 and 57 and current coils 58—61, and an ammeter 62 having current coils 63—66. The measuring instruments 45, 48, 55 and 62 may all be connected for simultaneous energization with the various resistances, so that indications of volts, watts, vars and amperes are given at the same time. The circuit will be described in greater detail in connection with an explanation of the operation and manipulation thereof.

As previously mentioned, the voltage components may be provided by a common source such as the transformer 70, the secondary winding of which is provided with a relatively large number of taps. An intermediate point of the transformer secondary such as that indicated at 71 may be arbitrarily designated as a point of 100% voltage, for the in-phase components and 0% voltage for the quadrature phase components and which point may be used as the basis of references for determining the position of the various connections to be made. The left end of the transformer secondary is assumed the point of zero voltage for the in-phase components while increasing values for both component voltages are obtained to the right of the point 71. Negative values of quadrature phase components may be obtained to the left of the point 71.

Inasmuch as the bus C voltage was selected above as the reference voltage then the bus terminals $C_p$ and $C_q$ may be connected by conductors 72 and 73 to the 100% voltage point 71 of the transformer secondary. It will be recalled that the voltage at bus A was given as 62,500 volts which, with reference to bus C voltage is $$\frac{62{,}500}{57{,}700} \times 100 = 108.3\%$$

Since the value of the in-phase component of voltage is usually very nearly equal to the total voltage, the bus terminal $A_p$ may be arbitrarily connected by conductor 74, first to the 108% tap on the transformer secondary. It will be obvious that the voltage at bus B will be somewhere between the voltage of bus A and bus C, and for convenience the bus terminal $B_p$ may be connected by conductor 75 to the 104% tap of the transformer secondary. The bus terminal $B_q$ may also be connected by conductor 76 to the same tap as the terminal $B_p$. It is pointed out that the above voltage connections to the transformer 70 are merely temporary approximations and that it will be necessary to make further adjustments of these connections to bring the analyzer into balance with the conditions of the actual network. These final adjustments will be made by trial and error through observation of the readings of the instruments until they register in agreement with the various known values. When such readings as are shown are obtained on certain of the instruments then the simultaneously occurring unknown values may be read on the other instruments without changing the tap connections.

In the case assumed, it will be obvious that the generator A is supplying the greater part of the load at bus C and consequently the total power output of generator A will be first adjusted on the analyzer. This may be done by depressing the two selector switches $S_{a1}$ and $S_{a2}$ the top contacts of which will first connect the bus sections $A_p$ and $A_q$ through conductors 77 and 78 to the instrument terminals 79 and 80, respectively. Closure of the lower set of contacts of the switch $S_{a1}$ connects the split pairs of $M_{ab}$ and $N_{ab}$ resistors to the bus terminals $B_p$ and $B_q$. Closure of the lower set of contacts of the switch $S_{a2}$ connects the split pairs of resistors $M_{ac}$ and $N_{ac}$ to the bus terminals $C_p$ and $C_q$. The connection of the bus terminal $A_q$ through conductor 90 to the transformer secondary is then adjusted until the wattmeter 48 gives an indication corresponding to the known power output of generator A or, in other words, $$\frac{28,500}{20,000} \text{ kw. or } 142.5\%$$

The circuit just described which was completed by closing the switches $S_{a1}$ and $S_{a2}$ effectively connected only the circuit links AB and AC to the terminals of bus A, and the resultant wattmeter reading is actually the measure of the power flowing in these two circuit links. As previously stated, however, the sum of the power flowing in all of the circuit links connected to a bus must correspond to the power supplied to such bus, consequently the indication of the wattmeter in this instance truly represents the real power output of generator A.

Figure 5:
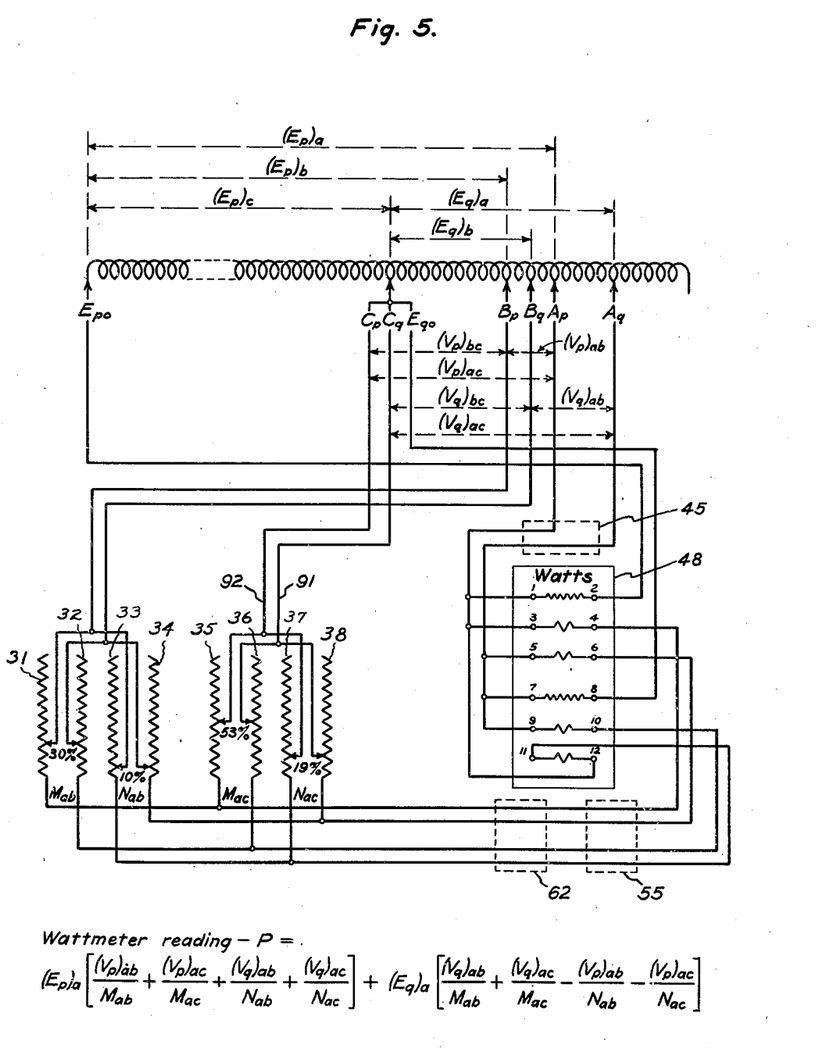
Fig. 5 is a wiring diagram illustrating one circuit of Fig. 4.

The circuits just described and which were completed by closing switches $S_{a1}$ and $S_{a2}$ for obtaining a reading of the real power output of generator A are shown with greater clarity in the simplified diagram of Fig. 5 in which all of the ineffective elements are omitted as well as all other measuring instruments except the wattmeter. It might be explained that the wattmeter 48 is essentially similar to a 3-phase, 3-wire, electro-dynamometer type of wattmeter with a zero center scale. The potential coils 1—2 and 7—8 are the moving coils whose combined torque act together to move the pointer. The current coils 3—4 and 5—6 are fixed coils which work together upon the potential coil 1—2 to produce the torque of the upper element of the instrument, while the current coils 9—10 and 11—12 are likewise fixed and work together upon the potential coil 7—8 to produce the torque of the lower element of the instrument. The varmeter 55 is the same as the wattmeter 48 except that the connections to certain of the coils are reversed in order that the current flow therethrough will correspond to corresponding changes in the plus and minus signs of the equation for the reactive power as compared with that for the real power which is measured by the wattmeter 48.

Referring further to Fig. 5 it will be seen that $(E_p)_a$, the in-phase component of voltage at bus A is acting across the potential coil 1—2 of the wattmeter. It will also be observed that the current in the wattmeter coil 3—4 is the algebraic sum of $(V_p)_{ab}/M_{ab}$ and $(V_p)_{ac}/M_{ac}$. And also that the current in the coil 5—6 is the algebraic sum of $(V_q)_{ab}/N_{ab}+(V_q)_{ac}/N_{ac}$. The torque developed in the top element of the wattmeter is therefore proportional to:

$$(E_p)_a \left[ \frac{(V_p)_{ab}}{M_{ab}} + \frac{(V_p)_{ac}}{M_{ac}} + \frac{(V_q)_{ab}}{N_{ab}} + \frac{(V_q)_{ac}}{N_{ac}} \right] \quad (9)$$

If the potentials and currents are traced for the lower element of the instrument it will be seen that the torque developed by the reaction of coils 7—12 is proportional to:

$$(E_q)_a \left[ \frac{(V_q)_{ab}}{M_{ab}} + \frac{(V_q)_{ac}}{M_{ac}} - \frac{(V_p)_{ab}}{N_{ab}} - \frac{(V_p)_{ac}}{N_{ac}} \right] \quad (10)$$

The total indication of the instrument 48, or the sum of the upper and lower element torques is expressed as a percentage equal to P thus:

$$P = (E_p)_a \left[ \frac{(V_p)_{ab}}{M_{ab}} + \frac{(V_p)_{ac}}{M_{ac}} + \frac{(V_q)_{ab}}{N_{ab}} + \frac{(V_q)_{ac}}{N_{ac}} \right] +$$

$$(E_q)_a \left[ \frac{(V_q)_{ab}}{M_{ab}} + \frac{(V_q)_{ac}}{M_{ac}} - \frac{(V_p)_{ab}}{N_{ab}} - \frac{(V_p)_{ac}}{N_{ac}} \right] \quad (11)$$

By comparison of Equation 7 with Equation 11 it will be noted that, $$\Sigma(V_p/M) = \frac{(V_p)_{ab}}{M_{ab}} + \frac{(V_p)_{ac}}{M_{ac}}$$

$$\Sigma(V_q/N) = \frac{(V_q)_{ab}}{N_{ab}} + \frac{(V_q)_{ac}}{N_{ac}}$$

$$\Sigma(V_q/M) = \frac{(V_q)_{ab}}{M_{ab}} + \frac{(V_q)_{ac}}{M_{ac}}$$

$$\Sigma(V_p/N) = \frac{(V_p)_{ab}}{N_{ab}} - \frac{(V_p)_{ac}}{N_{ac}}$$

With the tap connections for the bus terminals $A_p$ and $A_q$ thus adjusted to reasonably correct positions, and since the bus terminals $C_p$ and $C_q$ are fixed, the bus terminals $B_p$ and $B_q$ must now be adjusted. Because of the fact that in the problem as stated none of the conditions of either power or voltage are known for the bus B it is necessary to effect adjustment of the tap connections for the terminals $B_p$ and $B_q$ by measuring the power supplied to the load C. By releasing the switches $S_{a1}$ and $S_{a2}$ and depressing the switches $S_{c1}$ and $S_{c2}$, see Fig. 4, voltage components will be impressed across the pairs of resistors $M_{ac}$, $N_{ac}$, $M_{bc}$, and $N_{bc}$ which represent the links $Z_{ac}$ and $Z_{bc}$ of the actual network and which supply the power to bus C. The tap connection for the bus terminal $B_q$ will be first adjusted until the desired value of $$\frac{44,000}{20,000} \text{ kw. or } 220\%$$

is indicated on the wattmeter 48, which will correspond with the assumed known value of real power supplied to the load C.

If the circuits thus established are followed through it will be seen that the top element of the wattmeter 48 will experience a torque proportional to:

$$(E_p)_c \left[ \frac{(V_p)_{ca}}{M_{ac}} + \frac{(V_p)_{cb}}{M_{bc}} + \frac{(V_q)_{ca}}{N_{ac}} + \frac{(V_q)_{cb}}{N_{bc}} \right] \quad (12)$$

Similarly, it will be seen that the torque developed in the lower element of the wattmeter is proportional to:

$$(E_q)_c \left[ \frac{(V_q)_{ca}}{M_{ac}} + \frac{(V_q)_{cb}}{M_{bc}} - \frac{(V_p)_{ca}}{N_{ac}} - \frac{(V_p)_{cb}}{N_{bc}} \right] \quad (13)$$

Equations 12 and 13 are, of course, similar to Equations 9 and 10 which were applicable for the power supplied to bus A. The reading of the wattmeter is obviously proportional to the combined torques of the upper and lower elements, or the sum of Equations 12 and 13.

The total power output of the generator A should then be checked again as previously described with further adjustment of the voltage tap of $A_q$ if necessary, to secure the proper reading on the wattmeter 48. This should be followed by a repetition of the reading of the total power delivered to bus C with further adjustment, if necessary, of the voltage tap $B_q$ for it will be obvious that a change in any one of the voltage tap connections will generally require further adjustment of the remainder. The reactive power of $Q_c$ supplied to bus C, should now be read on the varmeter 55 with suitable adjustment of the voltage $B_p$ until the desired reading of 11,000 kvar. is obtained on the varmeter 55.

Further minor adjustments in the voltages at busses A and B may be made until the loading conditions of the actual network are simulated with as high a degree of accuracy as may be desired. Once the calculator settings are balanced with the given network values all of the various unknowns may then be read upon the instruments by pushing the appropriate switches. To read the reactive power for generator A the switches $S_{a1}$ and $S_{a2}$ may be closed and the reactive power output of the generator A may be read on the varmeter 55. To obtain the various values for the circuit AB alone then it is necessary to hold only the switch $S_{a1}$ in the closed position. In this case the various measuring instruments are connected only across the resistance elements $M_{ab}$ and $N_{ab}$ which simulate the single circuit AB of the actual network. The voltage at the bus A end of this circuit can be read on the voltmeter 45, the real power, $P_{ab}$ on the wattmeter 48, the reactive power $Q_{ab}$ on the varmeter 55, while the current flow can be read on the ammeter 62.

Referring again to Fig. 5 the circuit connections which are completed by the closure of only the switch $S_{a1}$ would correspond with the circuit as shown except with the conductors 91 and 92 open circuited, so that only the resistors $M_{ab}$ and $N_{ab}$ would be energized. From the description as previously detailed it may be noted that the wattmeter 48 will be energized to provide an indication of real power corresponding to the following:

$$P_{ab} = (E_p)_a \left[ \frac{(V_p)_{ab}}{M_{ab}} + \frac{(V_q)_{ab}}{N_{ab}} \right] + (E_q)_a \left[ \frac{(V_q)_{ab}}{M_{ab}} - \frac{(V_p)_{ab}}{N_{ab}} \right] \quad (14)$$

and also that the varmeter 55 will provide an indication corresponding to the following:

$$Q_{ab} = -(E_q)_a \left[ \frac{(V_p)_{ab}}{M_{ab}} + \frac{(V_q)_{ab}}{N_{ab}} \right] + (E_p)_a \left[ \frac{(V_q)_{ab}}{M_{ab}} - \frac{(V_p)_{ab}}{N_{ab}} \right] \quad (15)$$

It will be apparent that by pushing only the switch $S_{a2}$ to the closed position the instruments will be connected to the pairs of resistor elements $M_{ac}$ and $N_{ac}$ whereby the circuit characteristics can be read for the network circuit link AC. By depressing the switches $S_{b1}$ and $S_{b2}$ the real and reactive power $P_b$, $Q_b$, respectively, supplied to the bus B by the generator B, as well as the bus voltage $E_b$ may be read. By pushing the switch $S_{b1}$ only to the closed position the real and reactive power flowing only in circuit BA, that is, $P_{ba}$ and $Q_{ba}$ may be read. Also by pushing only the switch $S_{b2}$ to the closed position the real and reactive power, $P_{bc}$ and $Q_{bc}$ may be read. By similarly manipulating the switches $S_{c1}$ and $S_{c2}$ the various values may be read for bus C.

For purposes of further illustrating the mathematical basis of the analyzer some simple computations will be tabulated based upon the assumed known values of the network problem. It is first assumed that the system connected as shown in Fig. 4 is balanced, that is, the various known values were read upon the instruments with the following connections made to the voltage divider or transformer 70:

Tabulation 3

$(E_p)_a = 108\%$; $(E_q)_a = 12\%$; $(E_p)_b = 106\%$;
$(E_q)_b = 7\%$; $(E_p)_c = 100\%$; $(E_q)_c = 0\%$

The voltage drop components $V_p$ and $V_q$ in the three circuits are:

Tabulation 4

$(V_p)_{ab} = (E_p)_a - (E_p)_b = 108 - 106 = 2\%$
$(V_p)_{ac} = (E_p)_a - (E_p)_c = 108 - 100 = 8\%$
$(V_p)_{bc} = (E_p)_b - (E_p)_c = 106 - 100 = 6\%$
$(V_p)_{ba} = (E_p)_b - (E_p)_a = 106 - 108 = -2\%$
$(V_p)_{ca} = (E_p)_c - (E_p)_a = 100 - 108 = -8\%$
$(V_p)_{cb} = (E_p)_c - (E_p)_b = 100 - 106 = -6\%$
$(V_q)_{ab} = 12 - 7 = 5\%$   $(V_q)_{ba} = 7 - 12 = -5\%$
$(V_q)_{ac} = 12 - 0 = 12\%$   $(V_q)_{ca} = 0 - 12 = -12\%$
$(V_q)_{bc} = 7 - 0 = 7\%$   $(V_q)_{cb} = 0 - 7 = -7\%$

In the following computations it will be understood that all of the numerals are percentage values but for sake of greater clarity the percent sign will be deleted except in the final answers.

The percentage values as computed above are substituted for the various terms of Equation 14 thus:

$$P_{ab} = 108 \left( \frac{2}{30} + \frac{5}{10} \right) + 12 \left( \frac{5}{30} - \frac{2}{10} \right) = +60.7\%$$

In a like manner it may be determined that:

$Q_{ab} = -10.36\%$
$P_{ac} = -82.16\%$
$Q_{ac} = -30.43\%$

It will be obvious that the real power supplied to the bus A by generator A will be equal to the real power flowing in each of the two circuit links AB, and AC thus:

$$P_a = P_{ab} + P_{ac} = 60.7 + 82.16 = 142.86\%$$

Similarly:

$$Q_a = Q_{ab} + Q_{ac} = -10.36 - 30.43 = -40.79\%$$

The voltage of bus A will be equal to the vectorial sum of the phase and quadrature voltage components thus:

$$E_a = (E_p)_a + j(E_q)_a = 108 + j12 = 108.6\%$$

The various values corresponding to the above which will occur at bus B may be calculated by following the procedure as outlined above as follows:

Tabulation 5

| | |
|---|---|
| $P_{ba} = -59.87\%$ | $P_b = 89.13\%$ |
| $Q_{ba} = 7.47\%$ | $Q_b = -40.33\%$ |
| $P_{bc} = 149\%$ | $E_b = 106.1\%$ |
| $Q_{bc} = -47.8\%$ | |

The various values for bus C may be computed and tabulated as follows:

Tabulation 6

| | |
|---|---|
| $P_{ca} = -78.2\%$ | $P_c = -221.2\%$ |
| $Q_{ca} = +19.5\%$ | $Q_c = 55.2\%$ |
| $P_{cb} = -143\%$ | $E_c = 100\%$ |
| $Q_{cb} = +35.7\%$ | |

The resultant values having thus been determined on a percentage basis, it is necessary to reconvert them to electrical units and on the basis of the actual network conditions. The converted values may be listed as follows:

Tabulation 7

At bus A:

$$P_a = \frac{142.86}{100} \times 20{,}000 = 28{,}572 \text{ kw.}$$

$$Q_a = \frac{-40.79}{100} \times 20{,}000 = -8158 \text{ kvar.}$$

$$P_{ab} = \frac{60.7}{100} \times 20{,}000 = 12140 \text{ kw.}$$

$$Q_{ab} = \frac{-10.36}{100} \times 20{,}000 = -2072 \text{ kvar.}$$

$$P_{ac} = \frac{82.16}{100} \times 20{,}000 = 16432 \text{ kw.}$$

$$Q_{ac} = \frac{-30.43}{100} \times 20{,}000 = 6086 \text{ kvar.}$$

$$E_a = \frac{108.6}{100} \times 57{,}700 = 62{,}700 \text{ volts}$$

At bus B:

$P_b = 17{,}826$ kw.
$Q_b = -8066$ kvar.
$P_{ba} = -11{,}974$ kw.
$Q_{ba} = 1494$ kvar.
$P_{bc} = 29{,}800$ kw.
$Q_{bc} = -9560$ kvar.
$E_b = 61{,}300$ volts At bus C:

$P_c = -44{,}240$ kw.
$Q_c = 11{,}040$ kvar.
$P_{ca} = -15{,}640$ kw.
$Q_{ca} = 3900$ kvar.
$P_{cb} = -28{,}600$ kw.
$Q_{cb} = 7140$ kvar.
$E_c = 57{,}700$ volts While in the case of the network presented in Fig. 1 and with various known and unknown values as given the computation of the various real and reactive power values is relatively simple, this would not be true in the case of more involved networks. However, with the use of the analyzer as described, all of the various percentage values as set forth in the tabulations above can be read directly upon the various instruments incorporated in the analyzer.

It should be obvious to one skilled in the art that the present calculator is capable of handling any number of circuit links which may be connected to any one bus. Each circuit link may be represented by two pairs of M and N resistor units and which may be arranged in the analyzer circuit in the same manner as the various M and N resistors shown in Fig. 4. A pair of selector switches should be provided for each of the sets of M and N resistors in order that each link may be connected in the various combinations of circuits representing the actual conditions at the busses at each of the opposite ends of such links. It will furthermore be understood that it will not be necessary to supply separate and independent resistor units for each of the various circuit links of a network, but only so many as correspond with the maximum number of circuit links which may be connected to any one bus. By the provision of a multiplicity of taps on the different sets of M and N resistors the use of certain ones may be duplicated so long as the use of any set is not otherwise required for the representation of another link connected to the same bus.

In the network shown in Fig. 1 the various busses are interconnected by straight circuits without any intermediate transformers. In the average network the circuit links frequently include transformers for boosting the circuit voltage or for changing it from one value to another and consequently any analyzer for solving network problems, to be at all practicable, must be capable of taking into account such voltage transformation apparatus as may be provided in any link circuit connected to any bus in the network. It is a relatively simple matter to introduce voltage variables in the analyzer of the present invention and this may be illustrated with particular reference to Figs. 6 and 7 of the drawings.

Figure 6:
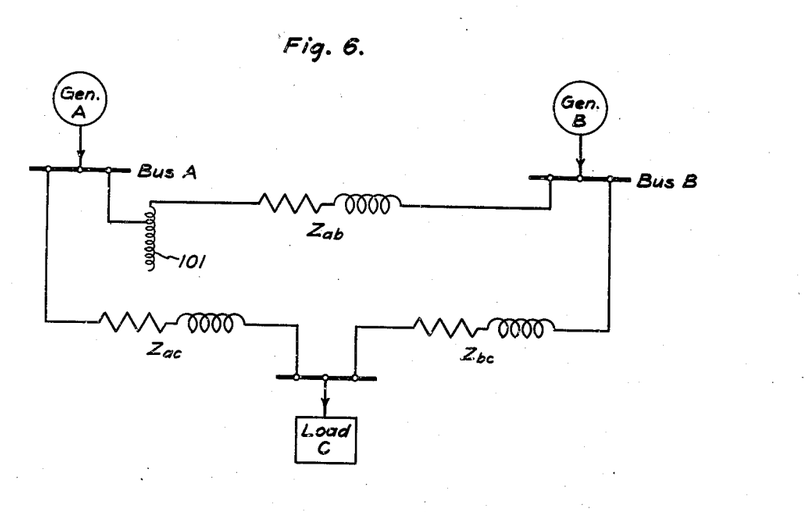
Fig. 6 is a schematic impedance diagram of one phase of an actual network of a modified form.

Referring first to Fig. 6 a network is shown which is substantially similar to that shown in Fig. 1, with the exception that a boosting transformer 101 is provided in the link circuit, connecting busses A and B, the transformer being adjacent the bus A. The representation in this case is again relatively simple, but it adequately illustrates any voltage transformer arrangement, as will readily be understood by one skilled in the art.

Figure 7:
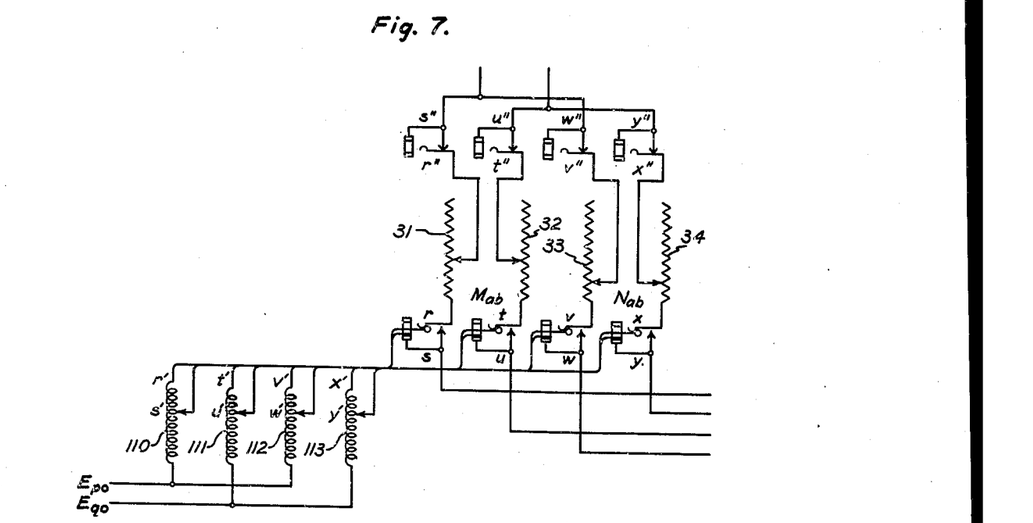
Fig. 7 is a fragmentary portion of the wiring diagram of Fig. 4 as the latter may be modified for analyzing the network of Fig. 6.

In Fig. 7 is illustrated a portion of the diagram of Fig. 4 or 5 including the pairs of resistors, $M_{ab}$, $N_{ab}$, and the various connections thereto. It will be recalled that these resistors represent the network link AB across which are impressed the two voltage components. With the network link including a transformer, such as a boosting transformer, it is necessary to insert similar voltage increments into each voltage component impressed across these resistors and which may be accomplished by connecting identical portions of auto-transformer windings in series with each of the individual resistors. As illustrated in Fig. 7 four auto-transformers 110, 111, 112 and 113 are shown, portions of which are adapted to be connected by any suitable means such as a plug and jack arrangement into the resistor circuits. The jack contacts in the resistor circuits are identified by the reference characters $r$—$s$, $t$—$u$, $v$—$w$, $x$—$y$, which jack contacts are normally closed and adapted to be connected by plugs to the terminals of the various transformers identified by corresponding reference characters, $r'$—$s'$, $t'$—$u'$, $v'$—$w'$, $x'$—$y'$. The outer end terminals of the transformers 110, 112 are connected by conductor 120 to the 0% voltage terminal of the transformer 70 while the outer end terminals of the other pair of transformers 111, 113 are connected to the intermediate terminal 71 of the transformer 70. By adjustment of the midtap on the auto-transformers any required variation in the voltage components may be obtained, while either buck or boost may be effected by proper selection of the direction of current flow through the transformers.

It will be apparent that the insertion of the potential increments into the circuits of the M and N resistors would have to be made before the connections of the various $p$ and $q$ bus terminals are adjusted to their final positions upon the secondary of the transformer 70. Furthermore, the positions of the transformer connections with regard to the M and N resistors will have to be made to correspond with the direction of the power flow occurring in the circuit which is being measured. For example, the boosting transformers 110—113 will be plugged into the jacks $r$—$s$, $t$—$u$, $v$—$w$ and $x$—$y$ for the measurement of power flow at bus A, or the measurement of power flow in the circuit from bus A to bus B. In such case the boosting transformers are effectively connected ahead of the various M and N resistors. For measurement of the various conditions for bus B then, of course, the relative positions of the various transformers with respect to the M and N resistors and the direction of current flow therethrough must be reversed. As shown in Fig. 7 a second set of jacks, $r''$—$s''$, $t''$—$u''$, $v''$—$w''$, $x''$—$y''$ are provided in series with each of the corresponding resistors but on the opposite sides thereof with respect to the jacks previously described. Whenever the circuit is closed through the selector switch $S_{b1}$ for taking measurements for bus B, the position of the transformer connections must be transferred from the positions shown in full line in Fig. 7 to the upper set of jacks. In a similar manner any condition of voltage transformation in any network link may be effectively simulated in the present analyzer.

Figure 8:
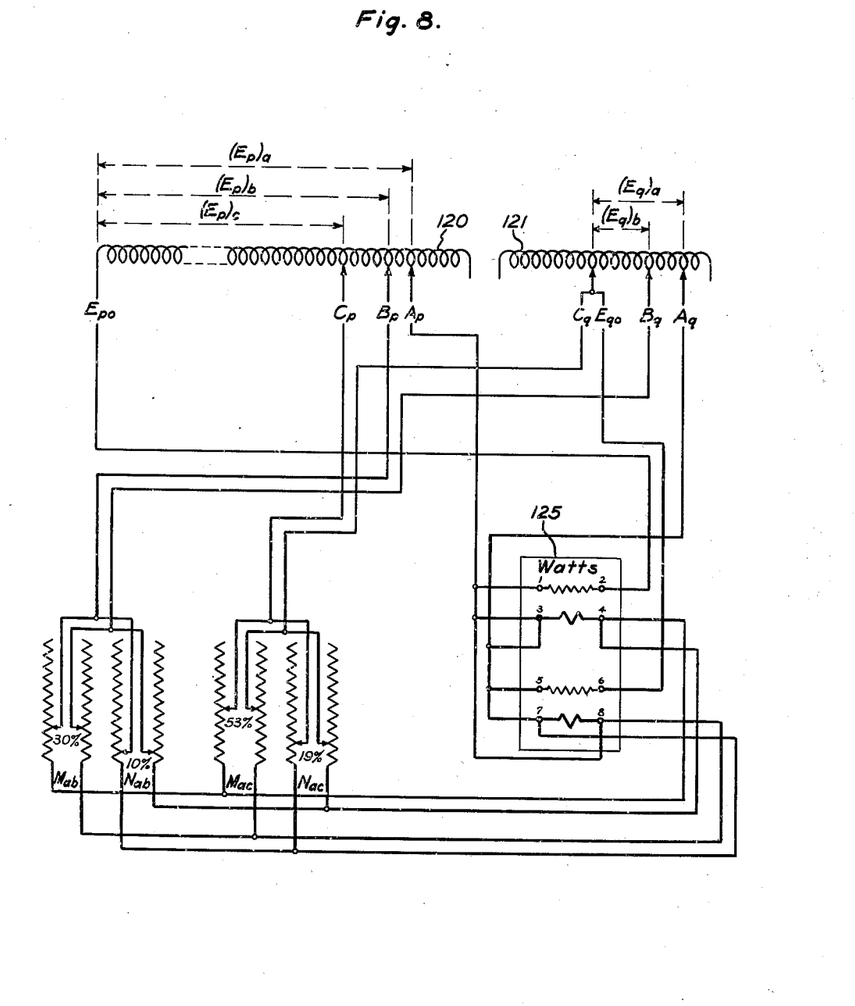
Fig. 8 is a wiring diagram illustrating the analyzer according to a further modification of the invention.

With particular reference to Figs. 4 and 5, it was previously described that the phase and quadrature voltage components were preferably obtained from spaced tapped connections to the secondary of a common transformer. This is not essential and under certain conditions it may, in fact, be preferred to provide the phase and quadrature voltage components from independent sources of supply. Referring to Fig. 8 there is shown a circuit arrangement which is a full equivalent for the circuit shown in Fig. 5, the terminals of the phase section of the simulated network being in this case connected to suitable taps of a first secondary winding 120 of a transformer while the terminals of the quadrature section of the simulated network are connected to suitable taps of a secondary winding 121. The windings 120 and 121 are in themselves electrically insulated from each other though they may both be energized from the same core and primary winding. In the modification as described in connection with Figs. 4 and 5 in which the component voltages were all supplied from a single secondary transformer winding, it was necessary to provide the wattmeter and the varmeter each with an extra current coil on both the upper and lower elements. In the present case with the phase and quadrature components of voltage supplied from electrically independent sources, standard measuring instruments may be employed such as indicated by the conventional three phase wattmeter indicated at 125. In this case the leads from the pairs of M and N resistors may be connected to the current coils as shown with one pair to the lowermost coil, 7—8, being reversed in accordance with the algebraic sign of the power equation, (7).

The varmeter is not shown in this diagram but, it will be obvious, that it may be correspondingly provided. The remainder of the circuit is substantially similar to that as shown in Fig. 5 and previously described in greater detail.

From the description as given, it will be obvious that the analyzer is susceptible of many variations as to the specific form of apparatus employed. It is intended in the following claims, however, to cover all such variations and modifications as fall within the true spirit and scope of the invention.

What I claim is:

1. A network analyzer including measuring means and first and second pairs of resistance elements, the first element of each said pair having a resistance proportional to the reciprocal of the conductance of a circuit link, the second element of each of said pairs having a resistance proportional to the reciprocal of the susceptance of said circuit link, means for impressing across said first pair of said resistance elements a potential proportional to the in-phase component of the voltage drop occurring across said circuit link, means for impressing across said second pair of resistance elements a potential proportional to the quadrature component of the voltage drop occurring across said circuit link, means for establishing voltages respectively proportional to the in-phase and quadrature components of voltage at one end of said circuit link, said measuring means including elements connected to said last-named in-phase component of voltage and to said first element of said first pair of resistance elements and to said second elements of said second pair of resistance elements for obtaining a first product of said last-named in-phase voltage component multiplied by the algebraic sum of the currents flowing through said two last-named resistance elements, and said measuring means having elements responsive to said last-named quadrature component of voltage and connected to said first element at said second pair of resistance elements and to said second element of said first pair of resistance elements for obtaining a second product of said last-named quadrature component of voltage multiplied by the algebraic difference between the currents flowing through said two last-named resistance elements, and said elements of said measuring means being so associated as to provide an indication of the real power flowing at said one end of said circuit in terms of the algebraic sum of said two products.

2. A network analyzer including measuring means and first and second pairs of resistance elements, the first element of each said pair having a resistance proportional to the reciprocal of the conductance of a circuit link, the second element of each of said pairs having a resistance proportional to the reciprocal of the susceptance of said circuit link, means for impressing across said first pair of said resistance elements a potential proportional to the in-phase component of the voltage drop occurring across said circuit link, means for impressing across said second pair of resistance elements a potential proportional to the quadrature component of the voltage drop occurring across said circuit link, means for establishing voltages respectively proportional to the in-phase and quadrature components of voltage at one end of said circuit link, said measuring means including elements connected to said last-named in-phase component of voltage and to said first element of said first pair of resistance elements and to said second element of said second pair of resistance elements for obtaining a first product of said last-named in-phase voltage component multiplied by the algebraic sum of the currents flowing through said first pair of resistance elements, and said measuring means having elements responsive to said last-named quadrature component of voltage and connected to said first element of said pair of resistance elements and to said second element of said first pair of resistance elements for obtaining a second product of said last-named quadrature component of voltage multiplied by the algebraic difference between the currents flowing through said two last-named resistance elements, said elements of said measuring means being so associated as to provide an indication of the real power flowing at said one end of said circuit in terms of the algebraic sum of said two products, a second measuring means having elements for obtaining a third product of said last-named in-phase component of voltage multiplied by the algebraic difference between the currents flowing through said two last-named resistance elements, said second measuring means having elements for obtaining a fourth product of said last-named quadrature component of voltage multiplied by the algebraic sum of the currents flowing through said first element of said first pair of resistance elements, and said second element of said second pair of resistance elements, and said elements of said second measuring means being so associated as to provide an indication of the reactive power at said one end of said link in terms of the algebraic difference between said third and fourth products.

3. A network analyzer including the combination of two pairs of resistance elements, one element of each pair having a resistance proportional to the reciprocal of the conductance of a circuit link, the other element of each of said pairs having a resistance proportional to the reciprocal of the susceptance of said circuit link, means for impressing across one of said pairs of resistance elements a potential proportional to the in-phase component of the voltage drop occurring across said circuit link, means for impressing across the other of said pairs of resistance elements a potential proportional to the quadrature component of the voltage drop occurring across said circuit link, means for establishing voltages proportional to the in-phase and quadrature components of the voltage at one end of said circuit link measuring means, means for connecting said measuring means to said pairs of resistance elements for response to the algebraic sum of the currents flowing through the two pairs of said resistance elements and for connecting said measuring means to said voltage-establishing means for response to said voltages established as proportional to said in-phase and quadrature components of the voltage at one end of said circuit link to provide indications proportional to both real and reactive power flow through said circuit link.

4. A network analyzer comprising a plurality of dual pairs of resistance elements, the minimum number of dual pairs of resistance elements corresponding to the maximum number of circuit links connected to a common bus, one of each of said pairs having a resistance value proportional to the reciprocal of the conductance of a corresponding one of said circuit links, the second of each of said pairs having a resistance value proportional to the reciprocal of the susceptance of said corresponding circuit link, circuit connections for connecting said dual pairs of resistance elements in a network corresponding in link circuits with the network to be analyzed, means for impressing across one of each of said dual pairs a voltage corresponding to the inphase component of the voltage drop occurring across the corresponding circuit link and for impressing across the other of said dual pairs a voltage corresponding to the quadrature component of the voltage drop occurring across said corresponding circuit link, and individual circuits respectively connected to said corresponding resistance elements of each dual pair, each individual circuit thereof forming a current path for flow of the algebraic sum of the currents flowing through said corresponding resistance elements of said dual pairs.

5. A network analyzer comprising a plurality of resistance elements for simulating the resistances and reactances of the various links of an actual network, means for connecting said elements into two simulated networks of similar configuration and similar to said actual network, the corresponding links of said two simulated networks each comprising a pair of said elements, one element of each of said pairs having a resistance proportional to the reciprocal of the conductance and the other having a resistance proportional to the reciprocal of the susceptance of the corresponding link of the actual network, means for impressing across a selected number of said simulated networks potentials proportional to the in-phase and quadrature components respectively of voltage occurring across the corresponding link of the actual network and circuit means forming a current path for flow therein of the algebraic sum of the currents flowing through selected links of said simulated networks.

6. A network analyzer including a plurality of double pairs of resistance elements, the number of double pairs of said elements being at least as great as the maximum number of circuit links connected to a common bus of the actual network to be analyzed, means for connecting each of said pairs of said elements into two different simulated networks of similar configuration each corresponding to the configuration of the actual network, a first element of each of said pairs in each of said simulated networks having a resistance proportional to the reciprocal of the conductance of the corresponding actual network circuit link, the second element of each of said pairs in each of said simulated networks having a resistance proportional to the reciprocal of the susceptance of the said corresponding actual network circuit link and circuit means forming a current path for flow therein of the algebraic sum of the currents flowing through selected links of said simulated networks.

7. A network analyzer comprising a plurality of double pairs of resistance elements, means for connecting each pair of said double pairs into two similar simulated networks each such network having a configuration corresponding with that of the actual network to be analyzed, each combination of four of said resistance elements of each of said double pairs connected in said two simulated networks constituting a unit representing a corresponding circuit link of the actual network, one element of each of said pairs of said units having a resistance proportional to the reciprocal of the conductance and the other element of each of said pairs of said units having a resistance proportional to the reciprocal of the susceptance of the corresponding circuit link of the actual network, means for impressing across each of the pairs of elements of the first of said simulated networks potentials proportional to the in-phase component of voltage occurring across the corresponding circuit links of the actual network, means for impressing across the pairs of elements of the second of said simulated networks potentials proportional to the quadrature component of voltage occurring across the corresponding circuit links of the actual network, means for establishing voltages proportional to the in-phase and quadrature components of the voltage at any selected bus or any selected end of a circuit link at which power is to be measured, metering means having a plurality of actuating elements, means for selectively connecting said actuating elements of said metering means to said simulated networks and to said last-named voltages to obtain a measurement of real and reactive power flow proportional to that at said bus or an end of a circuit link in accordance with the expressions $$E_p \Sigma (V_p/M + V_q/N) + E_q \Sigma (V_q/M - V_p/N)$$

for real power and $$E_p \Sigma (V_q/M - V_p/N) - E_q \Sigma (V_p/M + V_q/N)$$

for reactive power and in which $E_p$ and $E_q$ are the in-phase and quadrature components respectively of the voltage at said bus or end of a selected circuit link, $V_p$ and $V_q$ are the in-phase and quadrature components respectively of the voltage drops across said corresponding circuit links and M and N are the reciprocals of the conductance and susceptance respectively of the circuit links of the actual network.

8. A network analyzer including measuring means and a first resistance element having a resistance proportional to the reciprocal of the conductance of a circuit link, means for impressing across said element a first potential proportional to the in-phase component of the voltage drop occurring across said circuit link to produce a flow of a first current, a second resistance element having a resistance proportional to the reciprocal of the susceptance of said circuit link, means for impressing across said element a second potential proportional to the quadrature component of said voltage drop to produce a flow of a second current, means for establishing a third voltage proportional to the in-phase component of voltage at one end of said circuit link, measuring means having elements respectively responsive to said first and second currents and to said third voltage for producing a first product representing the algebraic sum of said currents multiplied by said third voltage, a third resistance element having a resistance proportional to the reciprocal of the conductance of said circuit link, means for impressing across said third element said second voltage to produce flow of a third current, a fourth resistance element having a resistance proportional to the reciprocal of the susceptance of said circuit link, means for impressing across said fourth element said first voltage to produce flow of a fourth current, means for establishing a fourth voltage proportional to the quadrature component of said voltage at said one end of said link, said measuring means having additional elements responsive to said third and fourth currents and to said fourth voltage for producing a second product representing the algebraic difference between said third and fourth currents multiplied by said fourth voltage, and said measuring means having means for indicating the real power flowing at said one end of said link in terms of the algebraic sum of said first and second products.

9. A network analyzer including measuring means and a first resistance element having a resistance proportional to the reciprocal of the conductance of a circuit link, means for impressing across said element a first potential proportional to the in-phase component of the voltage drop occurring across said circuit link to produce a flow of a first current, a second resistance element having a resistance proportional to the reciprocal of the susceptance of said circuit link, means for impressing across said element a second potential proportional to the quadrature component of said voltage drop to produce a flow of a second current, means for establishing a third voltage proportional to the in-phase component of voltage at one end of said circuit link, measuring means having elements respectively responsive to said first and second currents and to said third voltage for producing a first product representing the algebraic sum of said currents multiplied by said third voltage, a third resistance element having a resistance proportional to the reciprocal of the conductance of said circuit link, means for impressing across said third element said second voltage to produce flow of a third current, a fourth resistance element having a resistance proportional to the reciprocal of the susceptance of said circuit link, means for impressing across said fourth element said first voltage to produce flow of a fourth current, means for establishing a fourth voltage proportional to the quadrature component of said voltage at said one end of said link, said measuring means having additional elements responsive to said third and fourth currents and to said fourth voltage for producing a second product representing the algebraic difference between said third and fourth currents multiplied by said fourth voltage, said measuring means having means for indicating the real power flowing at said one end of said link in terms of the algebraic sum of said first and second products, a second measuring means having elements for obtaining a third product of the in-phase component of voltage at said one end of said link multiplied by the algebraic difference between said third and fourth currents, said second measuring means having elements for obtaining a fourth product of said quadrature component of said voltage at one end of said link multiplied by the algebraic sum of said first and second currents, and said second measuring means having means for indicating the reactive power at said one end of said link in terms of the algebraic difference between said third and fourth products.

WALDO E. ENNS.

REFERENCES CITED

The following references are of record in the file of this patent:

UNITED STATES PATENTS

| Number | Name | Date |
|---|---|---|
| 2,319,106 | Blackburn | May 11, 1943 |
| 2,323,588 | Enns | July 6, 1943 |

Certificate of Correction

Patent No. 2,491,095 December 13, 1949

WALDO E. ENNS

It is hereby certified that errors appear in the printed specification of the above numbered patent requiring correction as follows:

Column 3, line 70, strike out the words "If a vector voltage drop $V=V_p+jV_q$ occurs in" and insert instead *If a vector current $I=I_p+jI_q$ is flowing through*; column 4, line 11, for "$B=X/Z_2$" read *$B=X/Z^2$*; column 7, line 42, for "$M_{ab}$" read *$N_{ab}$*; column 8, line 68, for "shown" read *known*; column 10, line 25, for that portion of the equation reading $$=\frac{(V_p)_{ab}}{N_{ab}} \quad \text{read} \quad =-\frac{(V_p)_{ab}}{N_{ab}}$$

column 12, line 18, for "$12-=12\%$" read *$12=-12\%$*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*